United States Patent
Kurauchi et al.

[15] 3,636,436
[45] Jan. 18, 1972

[54] BELT FISSURE DETECTION DEVICE

[72] Inventors: Noritaka Kurauchi; Tokio Fujimoto, both of Suita; Kenichi Yoshida, Sakai; Masamitsu Ui; Zenji Nagata, both of Komaki; Hirokazu Kouno, Kasugai, all of Japan

[73] Assignees: Sumitomo Electric Industries, Ltd., Osaka; Tokai Rubber Industries, Ltd., Komaki, Japan

[22] Filed: Mar. 31, 1970

[21] Appl. No.: 24,242

[52] U.S. Cl. ............................. 324/34, 198/232, 340/259
[51] Int. Cl. ........................................................ G01r 33/00
[58] Field of Search ............... 324/34 R; 198/232, 193, 40; 340/259

[56] References Cited

FOREIGN PATENTS OR APPLICATIONS

| 127,922 | 8/1959 | U.S.S.R. | 198/232 |
| 147,132 | 9/1962 | U.S.S.R. | 198/232 |
| 1,233,324 | 1/1967 | Germany | 340/259 |
| 1,146,108 | 3/1969 | Great Britain | 198/232 |

Primary Examiner—Rudolph V. Rolinec
Assistant Examiner—R. J. Corcoran
Attorney—Carothers and Carothers

[57] ABSTRACT

A conveyor belt fissure detection apparatus having a plurality of pairs of fissure detecting coils buried in a conveyor belt in the transverse or belt-width direction and buried in the belt in the longitudinal direction with the pairs of coils being positioned at uniform intervals along the length of the conveyor belt to detect a fissure when it occurs either in the transverse or longitudinal direction of the belt thereby breaking any of the detecting coils. An exciting coil, excited by an oscillator and receiving coils connected to a detector circuit are positioned in proximity of the conveyor belt in aligned relation with the belt detecting coils embedded in the conveyor belt to electromagnetically couple with them when they travel by in proximity to the exciting and receiving coils. A fissure in the conveyor belt is detected by a detector circuit when one of the coils in the belt is broken causing signal interruption indicative of an occurrence of fissure in the belt.

17 Claims, 23 Drawing Figures

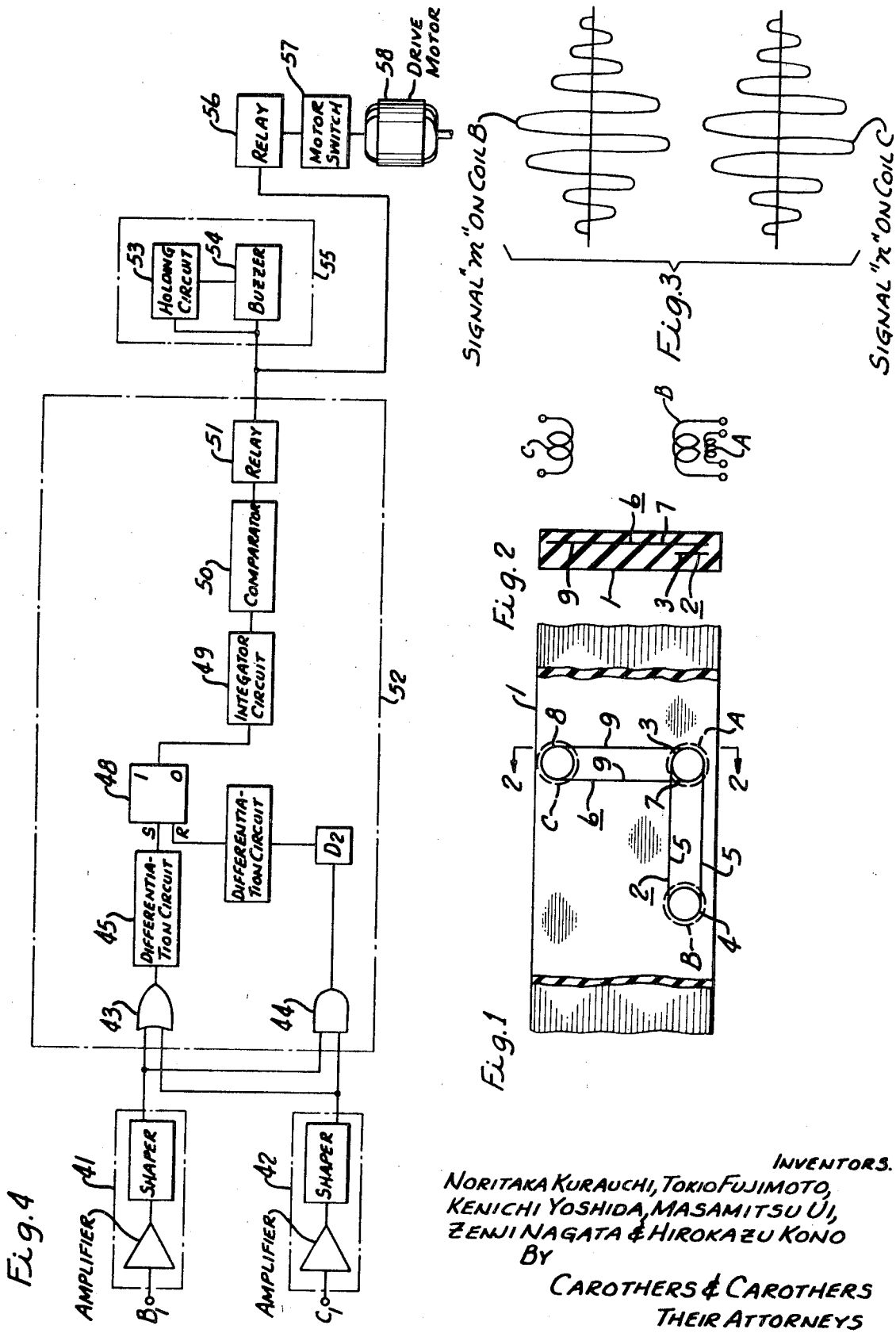

INVENTORS.
NORITAKA KURAUCHI, TOKIO FUJIMOTO,
KENICHI YOSHIDA, MASAMITSU UI,
ZENJI NAGATA & HIROKAZU KONO
BY
CAROTHERS & CAROTHERS
THEIR ATTORNEYS

PATENTED JAN 18 1972

INVENTORS.
NORITAKA KURAUCHI, TOKIO FUJIMOTO,
KENICHI YOSHIDA, MASAMITSU UI,
ZENJI NAGATA & HIROKAZU KONO

BY

CAROTHERS & CAROTHERS
THEIR ATTORNEYS

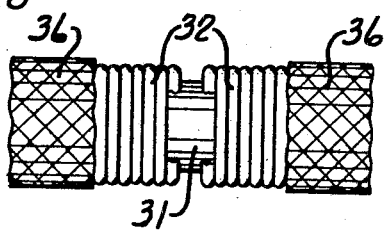
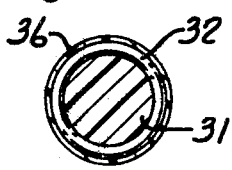
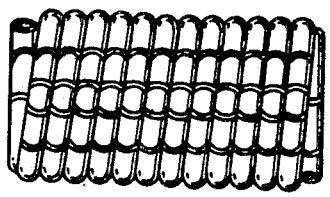
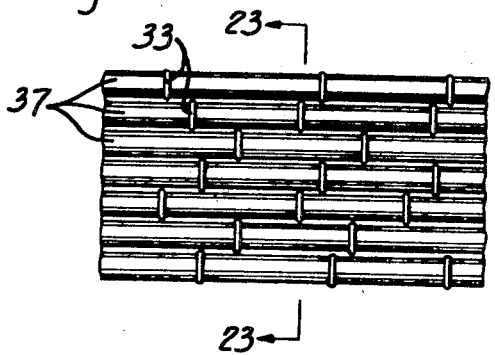
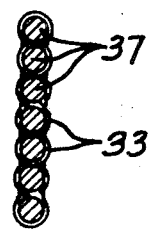

3,636,436

BELT FISSURE DETECTION DEVICE

BACKGROUND OF THE INVENTION

1. Field of the Invention

The present invention relates to a device for electrically detecting a fissure which may appear in an endless belt or the like used in belt conveyance.

2. Description of the Prior Art

It is well known that a conveyor belt for conveyance of lumpy materials such as coal and other mineral ore is sometimes torn by the impact of these lumpy materials loaded on the belt. In this instance, so long as no adequate measure is taken to detect a fissured portion of the belt and the belt is continuously operated in this condition, the fissure will develop over the entire length of the belt with the result that the belt will no longer be suitable for any type of use.

In a belt conveyor having a travel belt span of more than 100 meters, it is practically impossible to station attendant workers along the belt for the purpose of making a visual inspection of the belt in order to take precautions against a fissure occurrence on the surface thereof.

In order to detect the occurrence of such belt fissures, belt fissure detection devices have been conceived and two such examples are found in German Pat. No. 1,233,324 and U.S. Pat. No. 2,649,955.

According to the disclosure of the German patent, the belt fissure detection apparatus comprises three loop detector coils buried in a conveyor belt all at right angles relative to the longitudinal length of the belt, two of these loop detector coils being over lapped by the remaining or third loop coil at two different positions. Permanent magnets are positioned beneath the conveyor belt in correspondence with these two positions, and three receiver coils are suitably disposed, such as beneath the conveyor belt, so as to be magnetically coupled with each of the three respective loop coils.

Since the loop coils are excited by the permanent magnets, the induced current often varies with change of the traveling speed of the belt accompanying an undesirable fading of the wave form of this current. In the case where an oscillating coil to be operated by the alternating current is employed, instead of the permanent magnets, the leakage flux of both loop coils couples to the receiver coils since the interval between each oscillating coil to each receiver coil is too small.

Thus, this type of belt fissure detection device is not practical in view of its sensitivity.

Also adequate means for detecting fissures occurring in a direction normal to the longitudinal length of the belt is not provided.

SUMMARY OF THE INVENTION

The present invention is directed to eliminate the above-mentioned defects inherent in conventional belt fissure detection apparatus and has for the principle object to provide an improved belt fissure detection apparatus comprising an excitor coil and two receiver coils positioned adjacent to the bottom surface of the belt, a pair of loop coils embedded in the conveyor belt to be electromagnetically connected with said excitor and receiver coils, one coil being buried in the belt in the longitudinal direction of the conveyor belt adjacent to one edge of the belt while the other coil is buried in the belt at right angles relative to the first-mentioned loop coil and overlapped at its one end by the corresponding end of the first-mentioned loop coil. The arrangement is such that, when the overlapped ends of the loop coils travel just over the excitor coil as the belt is being driven, the other end of each of the loop coils also travels just over the respective receiver coils so that when an electromagnetic coupling between at least one of said loop coils and the corresponding receiver coil is broken, a fissure occurrence in the belt can be readily detected.

Another object of the present invention is the provision of belt follower means incorporated in the belt fissure detection device for establishing the above-mentioned arrangement of loop coils to be in register with the excitor and receiver coils to compensate for belt meandering even where the conveyor belt is employed to travel along a curved path.

Still another object of the present invention is to provide a sufficiently durable wiring material for the loop coils to be buried within the belt, which may be employed in connection with the fissure detection device comprising this invention.

BRIEF DESCRIPTION OF THE DRAWINGS

Other objects and advantages appear hereinafter in the following description and claims.

The accompanying drawings show, for the purpose of exemplification without limiting the invention or the claims thereto, certain practical embodiments illustrating the principles of this invention wherein:

FIG. 1 is a plan view of a portion of a conveyor belt with a sectional layer of the belt cut away showing the employment of the loop detection coils and their relationship with the excitor and receiver coils, being the principle embodiment of the present invention;

FIG. 2 is a full cross-sectional view of the conveyor belt of FIG. 1 taken along the line 2—2 of FIG. 1;

FIG. 3 are schematic diagrams of wave forms ($m$) and ($n$) of the electric signals respectively sensed by the receiver coils of the belt fissure detection apparatus comprising this invention;

FIG. 4 is a block diagram of the circuit comprising the belt fissure detector unit;

FIG. 18 shows a portion of a wire material for the coils buried in the belt in accordance with the present invention;

FIG. 19 is a cross-sectional view of an end portion of the wire material shown in FIG. 18 taken along the line 19—19 of FIG. 18;

FIG. 20 shows a portion of a modified wire material for the coils in accordance with the present invention;

FIG. 21 shows a portion of another modified wire material for the coils in accordance with the present invention;

FIG. 22 shows a portion of still another modified wire material for the coils in accordance with the present invention; and FIG. 23 in a cross-sectional view of the wire material of FIG. 22 taken along the line 23–23 of FIG. 22

DESCRIPTION OF THE PREFERRED EMBODIMENTS

Figure 5:
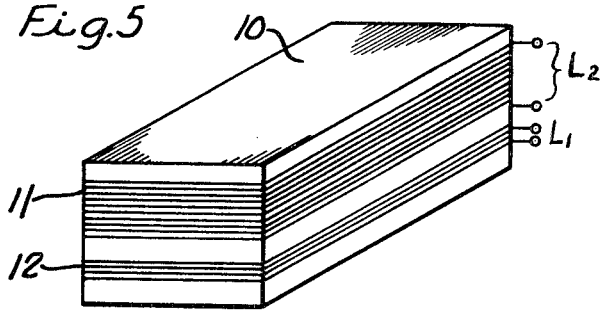
FIG. 5 is a perspective view representative of an excitor coil or one of the receiver coils employed in the belt fissure detection apparatus comprising this invention.

Reference is made to FIGS. 1 and 2 showing the belt fissure sensing apparatus wherein there is shown a conveyor belt 1 with a loop coil 2 buried within the conveyor belt 1 in the longitudinal direction of the belt adjacent and along one edge of belt 1 and including sensor portions 3 and 4, which are served by both ends of the loop coil 2. A pair of wires 5 connect in series the sensor portions 3 and 4. A loop coil 6 buried in the same conveyor belt 1 is positioned at a right angle relative to the loop coil 2 along the width of the conveyor belt and includes sensor portions 7 and 8, which are served by both ends of the loop coil 6. The sensor portion 7 is overlapped by the sensor portion 3 of the loop coil 2. A pair of wires 9 connect in series the sensor portions 7 and 8.

A plurality of such coil units consisting of the loop coils 2 and 6 as hereinbefore described are buried in the belt 1 in the longitudinal direction over the entire length thereof at suitable intervals, for example, in the range of every 20 to 100 meters. Obviously this range of intervals can be of greater or lesser magnitude.

An excitor coil indicated at A is connected with an excitor means. The receiver coils indicated at B & C are respectively connected to terminals B, & C receiver units 41 and 42 as shown in FIG. 4. This arrangement is such that, when the overlapped sensor portions 3 and 7 travel over the excitor coil A as the conveyor belt 1 is being driven, the other sensor portions 4 and 8 also simultaneously travel over the corresponding receiver coils B and C.

In this arrangement, when a sinusoidal oscillating current of approximately 10 kHz. to 100 kHz. or more is applied to each excitor coil A from the excitor means, this current will be transmitted to each of the receiver coils B and C by magnetic induction.

Signals having the wave forms "$m$" and "$n$" shown in FIG. 3, will be produced due to the movement of the conveyor belt 1, which signals are received by the receiver coils B and C and are transmitted, respectively, to two input terminals marked B. and C. of the detecting circuit of FIG. 4.

When at least one fissure appears in the conveyor belt 1 and any one of the wires 5 and 9 of the pairs of loop coils is thereby broken, no current is transmitted to the corresponding receiver coil B or C. Thus, the fissure is then detected by the detection circuit.

FIG. 4 shows a circuit diagram of the belt fissure detector unit comprising this invention and includes a logic circuit for detecting a fissure occurrence in the belt which operates an annunciator device and finally automatically stopping the conveyor belt drive means.

As described previously, when the sensor portions 3 and 7, and also sensor portions 4 and 8 of the loop coils 2 and 6 come in proximal position to be electromagnetically coupled with the excitor coil A, and the receiver coils B and C, respectively, the magnetic induction takes place so as to transmit the current from the excitor coil to the receiver coils through the respective pairs of wires 5 and 9. On the other hand, when a fissure occurs in the belt and any one of the wires 5 and 9 is consequently broken, no induced current is transmitted through the loop coil of that wire which is broken and the respective receiving coil does not receive a signal "$m$" or "$n$."

However, assuming that no fissure occurs in the belt and accordingly no breakage of the wires of the loop coils takes place, the receiver coils B and C produced an induced signal by the oscillating current passing the excitor coil A through the respective loop coils 2 and 6 so as to generate pulse signals having respective wave forms, as shown in FIG. 3, through the respective receiver units 41 and 42 wherein the signals detected by the receiver coils are first amplified and then sent through a shaper circuit as indicated in FIG. 4. Then, the shaped amplified pulse signals are in turn directed to an "OR" circuit and an "AND" circuit, respectively, in the logic circuit unit 52. So long as this no-fissure condition continues, the OR- and AND-gate circuits 43 and 44, respectively, continue to produce output signals, the output signal from the OR-circuit 43 being fed to a differentiation circuit 45 which acts to transform the received signal into a sharp positive pulse which is in turn fed to a set terminal S of a bistable flip-flop circuit 48. The output signal from the AND-circuit 44 is fed to a delay circuit $D_2$ and then to a differentiation circuit 47 which acts to transform the received signal into a sharp positive pulse which is in turn fed to the reset terminal R of the bistable flip-flop circuit 48 in a constantly delayed condition.

On the contrary, when any one of the wires 5 and 9 of the loop coils 2 and 6 is broken, the AND-circuit 44 will not generate therefrom any output signal since there is no simultaneous coincident of signals from the receiver units 43 and 44 on the two inputs to the AND-gate circuit 44, and, therefore, no input current is supplied to reset terminal R of the flip-flop circuit 48. As a result flip-flop circuit 48 will generate an output signal of constant value. The output signal of constant value from the flip-flop circuit 48 is then fed to an integrator circuit 49.

The integrator circuit 49 acts to integrate the constant value of the output signal from the flip-flop circuit 48 for a specified time, which will be in turn compared with the standard value of the current in a comparison circuit or comparator 50. When the integrated value of the output signal from the flip-flop circuit exceeds the standard value set at the comparator, a relay 51 will be operated to actuate an annunciator such as the buzzer 54 raising an alarm while a holding circuit 53, included in the annunciator console 55 together with the buzzer 54, is maintained in its operative condition to maintain the buzzer 54 in operation. At the same time, if desirable, the output signal from the relay 51 will operate another relay 56 to open switch 57 to cease the operation of motor 58 driving the conveyor belt.

So long as none of the wires of the loop coils 2 and 6 is broken, the receiver coils B and C normally receive their respective signals at the same time, which signals are fed simultaneously to the OR-circuit 43 and the AND-circuit 44 included in the logic circuit unit 52.

As previously described, with signal reception through the receiver coil B, the OR-circuit 43 will always generate an output signal to the differentiation circuit 45 wherein the output signal of which is differentiated so as to produce a sharp-positive pulse which is supplied to the set terminal S of the bistable flip-flop circuit 48. On the other hand, with signal reception through the receiver coil C as well as from the receiver coil B, the AND-circuit 44 will generate an output signal to the delay circuit $D_2$ wherein a retardation time of small value is imparted to the output signal. This delayed signal will be then supplied to the differentiation circuit 47 wherein this signal is differentiated so as to produce a sharp positive pulse which is in turn supplied to the reset terminal R of the bistable flip-flop circuit 48, causing the flip-flop circuit to be placed in its reset condition.

While the pulse signal is supplied from the differentiation circuit 45 to the set terminal S of the flip-flop circuit 48 and the pulse signal from the differentiation circuit 47 to the reset terminal R of the same, the flip-flop circuit is maintained in its inoperative or "low" condition and therefore inoperative on integrator circuit 49.

Figure 6:
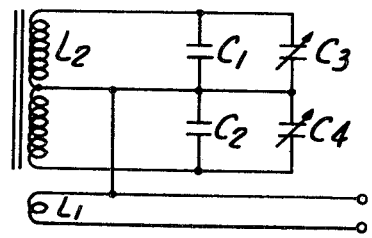
FIG. 6 is a circuit diagram of the excitor coil or one of the receiver coils shown in FIG. 5.

FIGS. 5 and 6 show details of construction of the excitor coil, which construction is also identical to that of either of the receiver coils B and C as above disclosed. FIG. 5 is a perspective view of the coil and FIG. 6 is a circuit diagram representative of the coil.

The excitor coil and receiver coil have the identical construction in the present invention.

FIG. 5 is a perspective view of the structure of the coil assembly having primary coil 12 and secondary coil 11 of the excitor coil or receiver coil, whatever the case may be.

In FIG. 5, the ferrite core 10 may have the dimensions of 2,500 square millimeters and 50 millimeters in length. The secondary coil $L_2$ of enameled wire 11, 0.1 mm. in diameter, is wound around the ferrite core 10 approximately 70 turns, and the primary coil $L_1$ of enameled wire 12 of the same diameter wound around the ferrite core 10 approximately two turns to couple magnetically with the secondary coil $L_2$. The primary coil $L_2$ is connected to an oscillating source or the detector circuit depending upon whether the structure is to be employed as an excitor coil or a receiver coil.

In FIG. 6, the secondary coil $L_2$ provides a resonance circuit together with the capacitors $C_1$, $C_2$, $C_3$ and $C_4$ and is magnetically coupled with the primary coil $L_1$, the latter being connected to an oscillating source in the case of an excitor coil, or connected to a detector circuit in the case of a receiving coil.

For example, when the circuit shown in FIG. 6 uses the coils as shown in the FIG. 5 and capacitors $C_1$, $C_2$ have a value of 800 pf., respectively, and variable capacitors $C_3$, $C_4$ have a variable value of 80–3,000 pf.,' respectively, a resonance circuit having a tuning frequency of 200 kHz. is provided.

In the case where the coil assembly shown in FIG. 5 is employed as an excitor coil, the primary coil $L_1$ of the coil assembly is connected to an oscillating source and a large resonance current flows in the secondary coil $L_2$ which is magnetically coupled with the primary coil $L_1$. The core 10 of the coil assembly provides magnetic flux due the resonance current of the secondary coil $L_2$.

Since the coil assembly of the excitor coil is placed in proximity to the moving conveyor belt in which the belt fissure detecting coils are embedded, the magnetic flux of the coil assembly of the excitor coil is magnetically interlinked with the belt fissure loop coils 2 and 6 to induce a current in the receiving coils B and C.

On the other hand, in the case where the coil assembly shown in FIG. 5 is used as a receiver coil B or C, the secondary coil $L_2$ is coupled with the magnetic flux which accompanies the induced current in the fissure loop coils 2 and 6 embedded in a moving conveyor belt placed in proximity to the coil assembly and a resonance current is induced in the tuning circuit by the secondary coil $L_2$. The resonance current of the secondary coil $L_2$ induces a current in the primary coil $L_1$ to be supplied to the detector circuit.

It has been largely understood that a fissure, if any, often appears on the belt surface in the longitudinal direction thereof rather than in the cross or lateral direction. Accordingly, one of the loop coils such as 2 which is buried in the belt along one edge of the conveyor belt 1 in accordance with the present invention is seldom susceptible to breakage while the other of the loop coils such as 6 which extends in the cross lateral direction thereof is more susceptible to breakage. Thus, so long as a pair of the loop coils 2 and 6 are buried in the belt in the L-shaped relationship in accordance with the present invention, the number of necessary loop coils to be employed along the length of the conveyor belt can be reduced resulting in the reduction of the total number of necessary excitor coils and receiver coils disposed or employed over the entire length of the conveyor belt.

In addition, since a sufficient space interval is provided between the excitor coil A and the receiver coil C over the entire width of the belt and since a sufficient interval is provided between the excitor coil and the receiver coil B in the longitudinal direction of the belt, these two different intervals being substantially equal to the distance therebetween, interference of electromagnetic connection between the excitor coil and either of the receiver coils can be substantially prevented so that sensitive detection of a fissure appearing in the belt can be ensured.

However, according to the embodiment as disclosed in FIG. 1, the only condition when a fissure occurring in the conveyor belt cannot be readily detected is where the break occurs at the overlapping sensor portions 3 and 7 of the loop coils 2 and 6.

Figure 7:
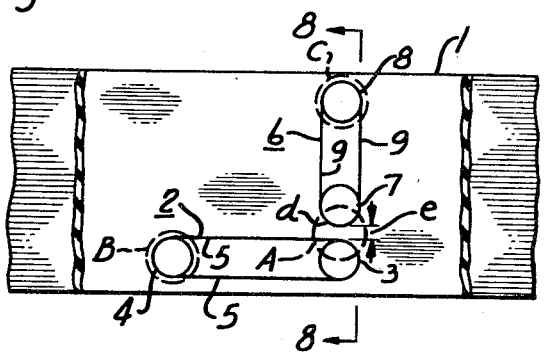
FIG. 7 is a plan view of a portion of a conveyor belt with a sectional layer of the belt cutaway depicting a modified embodiment of the present invention.
Figure 8:
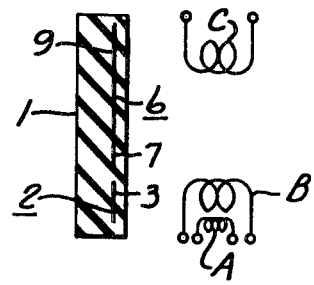
FIG. 8 is a full cross-sectional view of the conveyor belt of FIG. 7 taken along the line 8—8 of FIG. 7.

In order to provide for detection at this point of overlapping sensor portions 3 and 7, the arrangement of the loop coils 2 and 6 may be modified like that shown in FIG. 7 and FIG. 8, wherein elements comprising the belt fissure sensing devices are identical to that previously disclosed in FIG. 1, being designated by the same numerals and symbols.

Referring now to FIG. 7 and FIG. 8, a plurality of the loop coils 2 and 6 in L-shaped pairs are buried in the conveyor belt 1 at a suitable intervals along the length of the conveyor belt, for example, in the range of 20 to 100 meters, one of the loop coils 2 being adjacent to and along one edge of the conveyor belt while the other loop coil 6 being positioned across the width of the conveyor belt. However, in this instance, the sensor portion 7 of the loop coil 6 and the sensor portion 3 of the loop coil 2 are placed in spaced relationship, for example, a spacing distance indicated at "$e$," being a value of approximately 5 to 10 millimeter measured in the direction of the width of the conveyor belt. Despite the spacing "$e$" existing between the sensor portions 3 and 7, the excitor coil A is arranged beneath the conveyor belt 1 so as to be in register with an end portion of each of the sensor portions 3 and 7 in the conveyor belt as the belt is driven over the excitor coil A.

As to the arrangement of the other parts and operation of the fissure detection circuit, this is the same as disclosed in connection with FIG. 1 through FIG. 4.

Although in this instance only the excitor coil A is employed with respect to the loop coils 2 and 6, a pair of separate excitor coils may be employed with a single excitor means for each sensor portion 3 and 7.

With the spacing "$e$" provided as such, the sensor portions 3 and 7 cannot possibly be broken at the same time. Therefore, effective detection of the fissure occurrence in the belt can be ensured as against the case where the sensor portions 3 and 7 are in an overlapped relation to each other shown in FIG. 1.

However, there is another disadvantage made present in connection with the FIG. 7 embodiment, in that, when a fissure appears in the belt in the longitudinal direction running through the spacing "$e$," neither of the sensor portions are broken and, accordingly, the fissure detection circuit is incapable of operating the annunciator unit and indicating the occurrence of a fissure through spacing "$e$." Therefore, accurate detection of a fissure occurring in this instance is not possible. In order to eliminate this particular disadvantage, the arrangement of the loop coils 2 and 6 may be further modified as shown in FIGS. 9 and 10, wherein, again, elements comprising the belt fissure sensing apparatus are identical to those previously described with like elements being designated by the same numerals and symbols.

Figure 9:
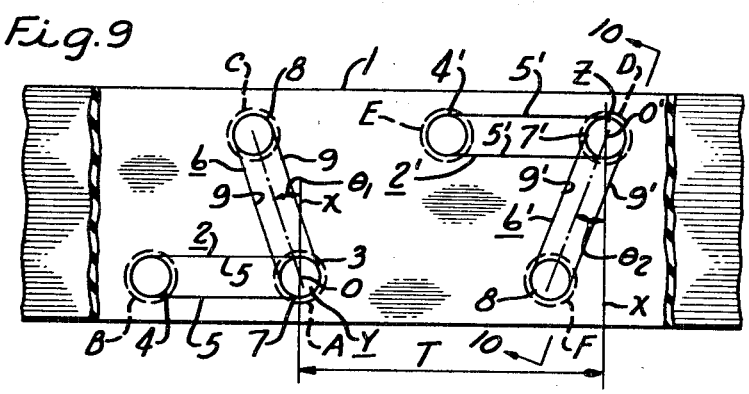
FIG. 9 is a plan view of a portion of a conveyor belt with a sectional layer of the belt cutaway depicting a still further modified embodiment of the present invention.
Figure 10:
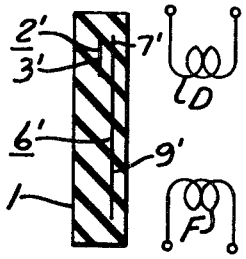
FIG. 10 is a full cross-sectional view of the conveyor belt of FIG. 9 taken along the line 10—10 of FIG. 9.

As shown in FIGS. 9 and 10, the component parts comprising the pairs of loop coils 2 and 6 buried in the conveyor belt are the same as those 2 and 6 mentioned in connection with the embodiment shown in FIG. 1, but the loop coils of one pair, generally designated as Y, and the adjacent pair, generally designated as Z, are disposed in an oppositely opposed but adjacent relationship separated by a distance T. One of the loop coils 6 and 6' of each respective pair of loop coils Y and Z is disposed in the conveyor belt in a transverse direction as compared to the coils 6 in the first-mentioned embodiment shown in FIG. 1 wherein the loop coil 6 is disposed normally relative to the longitudinal direction of the conveyor belt.

In other words, as can be understood from FIG. 9, the loop coil 2 of one pair of loop coils Y and the loop coil 2' of the adjacent pair of loop coils Z are respectively positioned along opposite edges of the conveyor belt in the longitudinal direction. However, the loop coils 6 and 6' of the adjacent pairs Y and Z, respectively, have respective angles $\theta_1$, $\theta_2$ relative to the normal construction lines X, separated by the distance indicated as T and passing through the center of the overlapping sensor portions 3 and 7, or 3' and 7' at right angles to the longitudinal direction of the conveyor belt.

The general arrangement of the loop coils 2 and 6, and 2' and 6' of each respective pair Y and Z relative to the corresponding excitor coils A or D and the corresponding receiver coils B and C or E and F is the same as described previously in connection with the first-mentioned embodiment shown in FIG. 1.

In this instance, the excitor coils A and D are connected to a common oscillating current source, the receiver coils B and E are connected to a common input terminal, such as B, of the receiver unit 41 shown in FIG. 4 while the receiver coils C and F are connected to a common input terminal, such as C, of the receiver unit 42 shown in the same figure.

According to the embodiment shown in FIG. 9, since each of the loop coils 6 and 6' is angularly disposed relative to the construction lines X, no interference because of magnetic flux occurs between these coils even when the conveyor belt 1 is in operation.

In addition, even if a fissure occurs in the conveyor belt at a position corresponding to the overlapping sensor portions 3 and 7 or 3' and 7' to an extent that the both loop coils 2 and 6 or, 2' and 6' of one of the respective pairs of loop coils Y or Z are entirely broken, the detection of the fissure occurrence can be ensured by the loop coils of the next or adjacent pair.

The loop coil arrangements as above disclosed in connection with the embodiments of FIGS. 1, 2, and 7 through FIG. 10 are incapable of reliably ensuring fissure detection upon occurrence of such a fissure and subsequent breakage of one of the loop coils, where the conveyor belt is laterally meandering while it travels along its conveyor path. This is because, when the conveyor belt is laterally meandering during its travel, any one of the sensor portions 3 and 7, or 4 or 8, which are served by the both ends of each loop coil 2 and 6 and initially positioned in register with the excitor and receiver coils A, B & C as hereinbefore described, is laterally displaced from a position in the range of effective electromagnetic coupling with excitor and receiver coils A, B & C.

Figure 11:
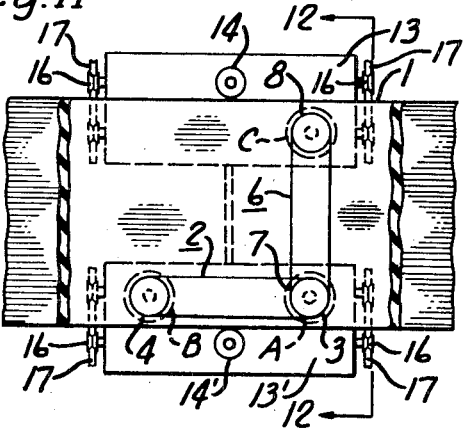
FIG. 11 is a plan view of a portion of a conveyor belt with a sectional layer of the belt cutaway and depicting belt follower means.
Figure 12:
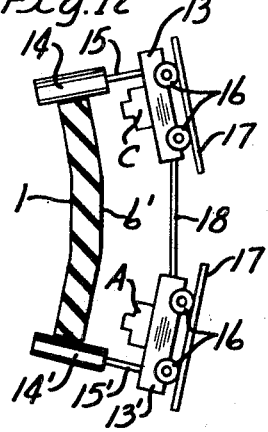
FIG. 12 is a full cross-sectional view of the conveyor belt of FIG. 11 taken along the line 12—12 of FIG. 11.

However, the arrangement as shown in FIG. 11 and FIG. 12 facilitates fissure detection even where the conveyor belt is laterally meandering during its course of travel in such a manner that the excitor and receiver coils are caused to follow the meandering travel of the conveyor belt in constant aligned register with the loop coils buried in the conveyor belt by employment of conveyor belt follower means engaging the longitudinal edges of the belt.

As shown in FIGS. 11 and 12, the follower means comprises a pair of carriages 13 and 13', each have two pairs of wheels 16 to support the carriages for movement along the rails 17 in a direction normal to the longitudinal direction of the conveyor belt. The carriages 13 and 13' are connected to each other for their travel on the rails 17 by means of a connecting rod 18. The ends of rod 18 are pivotally connected to each carriage. A pair of guide rollers 14 and 14' rotatably supported from the carriage 13 and 13', respectively, by means of support members 15 and 15' are set to engage the longitudinal edges of the conveyor belt 1.

The excitor coil A and the receiver coils B and C are mounted on the respective carriages 13 and 13' in such a manner that the sensor portion 8 of the loop coil 6 is in register with the receiver coil C mounted on the carriage 13, while the overlapping sensor portions 3 and 7 of both loop coils 2 and 6 and the sensor portion 4 of the loop coil 2 are, respectively, in register with the excitor coil A and the receiver coil B mounted on the carriage 13', regardless of whether or not the conveyor belt 1 is meandering along its path of travel.

In practice, when the conveyor belt 1 is actually meandering in a direction normal to the longitudinal length of the belt during its normal travel operation, one edge of the conveyor belt 1 will be directed against the guide roller of one of the carriages 13 and 13' causing the carriages, as connected, to move in the same lateral direction as the belt is meandering, the distance of the lateral movement of the carriages corresponding to the actual distance of the lateral movement of the conveyor belt 1.

Thus, the excitor and receiver coils A, B and C mounted on the respective carriages 13 and 13' are caused to continuously follow the respective sensor portions 3, 4, 7 and 8 of the loop coils 2 and 6 so as to, at all times, electromagnetically couple the excitor coil A to the receiver coils B and C with the embedded loop coils 2 and 6 throughout the meandering movement of the conveyor belt 1; thereby insuring fissure detection in the conveyor belt.

Figure 13:
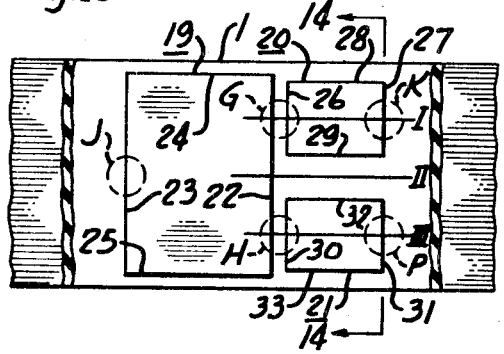
FIG. 13 is a plan view of a portion of a conveyor belt with a sectional layer of the belt cutaway depicting a further modified embodiment of the present invention.
Figure 14:
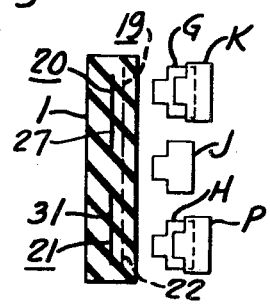
FIG. 14 is a full cross-sectional view of the conveyor belt of FIG. 13 taken along line 14—14 of FIG. 13.

FIGS. 13 and 14 show an embodiment compensating for conveyor belt meandering to insure fissure detection in the belt but eliminating the necessity of providing the conveyor belt follower means of FIGS. 11 and 12.

In the arrangement shown in FIGS. 13 and 14, each one of the loop coils 19, 20 and 21 buried in the conveyor belt 1, is positioned therein to form a rectangle or square or quadrangular configuration so that loop coil 19 has four sides, 22, 23, 24 and 25, loop coil 20 has four sides, 26, 27, 28 and 29, and loop coil 21 has four sides, 30, 31, 32 and 33.

The quadrangular-shaped loop coil 19 has a pair of coil sides 22 and 23 extending in a direction normal of the conveyor belt 1 in spaced parallel relation to each other and a pair of the coil sides 24 and 25 extending in the longitudinal direction of the conveyor belt 1, each along an edge of the conveyor belt and in parallel relationship. The quadrangular-shaped loop coils 20 and 21 are, in a similar manner, provided with a pair of the coil sides 26 and 27 and 30 and 31, respectively, extending in the normal direction of the conveyor belt and a pair of the coils sides 28 and 29 and 32 and 33, respectively, extending in longitudinal direction of the conveyor belt.

The three loop coils 19, 20 and 21 are buried in the conveyor belt 1 in such a manner that the side 22 of the loop coil 19 is suitably spaced from the parallel aligned sides 26 and 30 of the respective loop coils 20 and 21 while the side 29 of the loop coil 20 and the side 32 of the loop coil 21 are suitably spaced from each other in parallel aligned fashion.

In practice, a plurality of these three loop coils 19, 20 and 21, representing one unit are buried in the conveyor belt 1 along the length of belt at spaced intervals, as previously mentioned in connection with prior embodiments comprising this invention.

In FIGS. 13 and 14, the reference symbols G and H indicate excitor coils for connection to a single oscillating current source. The receiver coils J, K and P are connected to the belt fissure detector circuit.

The arrangement of the excitor coils and receiver coils with respect to the quadrangular-shaped loop coils is such that the adjacent sides 22, 26 and 22, 30 of the loop coils pass over the excitor coils G and H, respectively, during the travel of the conveyor belt, at the same instance when the sides 23, 27 and 31 of the loop coils pass over the receiver coils J, and K and P, respectively.

In this arrangement, assume that a fissure occurs along the position indicated at I. When a sinusoidal oscillating current of approximately 10 kHz. to 100 kHz. or more is applied to the excitor coils G and H, a break occurs in the sides 22, 26, or 27 of the loop coils 19 and 20 and the induced current is only received by the receiver coil P. If the fissure appears at a position indicated by II and a break appears in the side 22 of the loop coil 19, an induced current is received by the receiver coil J. If the fissure appears at a position indicated by III and a break appears in the sides 22, 30, or 31 of the loop coils 19 and 21, an induced current is only received by the receiver coil K. Therefore, by handling the receiver current of the receiver coils J, K and P, detection of the fissure appearing on the belt surface at any position over the entire width of the conveyor belt can be reliably insured, regardless whether or not the conveyor belt is laterally meandering during its progressive conveyor travel. In addition, since the distance between each of the excitor coils and the corresponding receiver coils may be adjusted by changing the length of each pair of the sides 24, 25; 28, 29; and 32, 33 of the respective loop coils 19, 20 and 21 in the longitudinal direction of the conveyor belt 1, interference between the direct electromagnetic coupling between the excitor coil and any one of the receiver coils is prevented.

Figure 15:
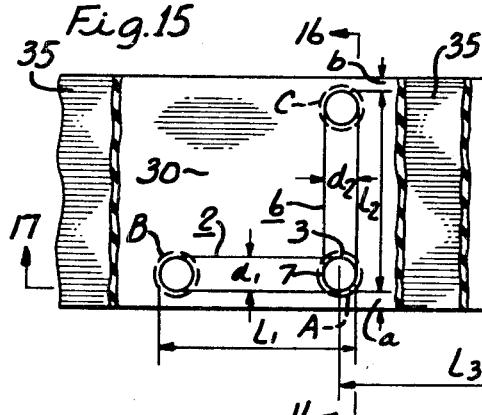
FIG. 15 is a plan view of a portion of a conveyor belt with a sectional layer of the belt cutaway depicting a still further modified embodiment of the present invention.
Figure 16:
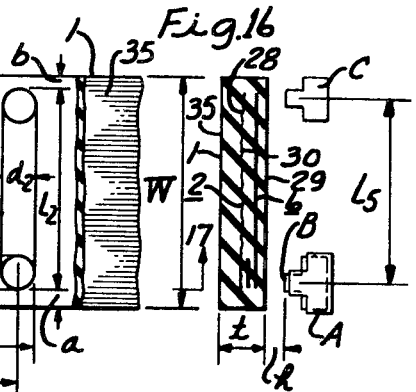
FIG. 16 is a full cross-sectional view of the conveyor belt of FIG. 15 taken along the line 16—16 of FIG. 15.
Figure 17:
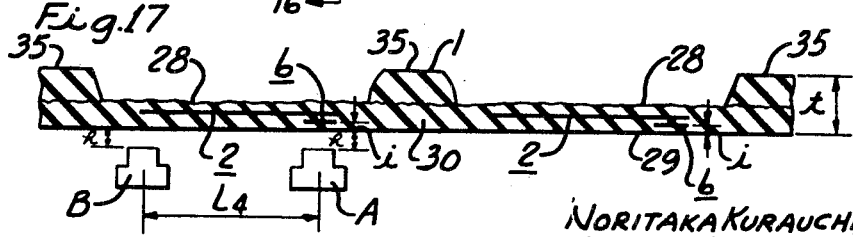
FIG. 17 is a longitudinal sectional side view of the conveyor belt of FIG. 15 taken along the line 17—17 of FIG. 15.

With reference to FIG. 15 through FIG. 17, the actual details of construction of a typical belt fissure detecting unit is described. The conveyor belt 1, in this instance being 1,200 mm. in width (W), 15 mm. in total thickness ($t$) and 1,060 m. in overall length, comprises a nylon fabric core 28 which includes five plies of cotton duck. The under surface 29 of the conveyor belt 1 consists of a rubber layer 30 positioned below the nylon fabric core 28. The conveyor belt has a rubber covering or layer 35 positioned above the nylon fabric core 28, the thickness of the rubber layer being approximately 3.2 mm.

The loop coil 2 is extended in the longitudinal direction along one edge of the belt and is spaced 30 mm. ($a$) from the conveyor belt edge and has the length ($L_1$) of 1,000 mm., a width ($d_1$) of 100 mm. and the magnitude of reactance is 0.1 to 1.0 mh. The loop coil 6 extending in a direction normal to the longitudinal direction of the conveyor belt 1 has its coil end 7 overlapped by the corresponding coil end 3 of the loop coil 2. Loop coil 6 has a length ($L_2$) of 1,140 mm., the width ($d_2$) of 100 mm. and the magnitude of reactance is 0.1 to 1.0 mh. Both ends of the loop coil 6 are spaced 30 mm. ($a,b$) from the respective edges of the conveyor belt. Both loop coils 2 and 6, are of course, buried in the belt, and are horizontally positioned with the lower rubber covering or layer 30 at a horizontal level of 3 mm. above the under surface 29 of the conveyor belt, the distance between the under surface to the coils being indicated by ($i$) in FIG. 17. A plurality of these coil units 2 and 6 are arranged in the interior of the belt in the longitudinal direction at suitable intervals ($L_3$) of 20 m. for the entire length of the conveyor belt.

An excitor coil A is connected with an oscillating device having the output capacity of 100 mw. for supplying a current having a frequency of 100 kc. The receiver coils B and C are connected with a single belt fissure detection device having the detection capacity of 0 to 100 db. The excitor coil A is positioned at a suitable spaced interval ($h$) within the range of 50 to 100 mm. below the under surface 29 of the conveyor belt. The receiver coils B and C are similarly disposed below the under surface 29 of the conveyor belt and spaced from each other at an interval ($L_5$) of 1,040 mm. A distance ($L_4$) is maintained between the excitor coil A and the receiver coil B of 900 mm.

Although the loop coils are buried in the belt at a position below the nylon fabric core 28, they may also be buried at a position above the nylon fabric core 28, namely, in the upper rubber covering or layer 35. However, in the case where material for the core 28 is employed is a steel cord, it is desirable to embed the loop coils 2 and 6 at a position below the steel core in the lower layer 30.

The details of the wiring material for the loop coils employed in connection with the belt fissure detection apparatus in accordance with the present invention is disclosed with reference to FIG. 18 through FIG. 23.

It has been well known that a conveyor belt is frequently subjected, during its operation, to repeated positive and negative bending and also to impacts of loads carried by the belt as the conveyor belt is being passed over various pulleys, such as the drive pulleys, the head pulleys, the takeup pulleys, the bend pulleys and the snab pulleys. Furthermore, in the case where the belt is to be guided by trough-forming idlers, the belt is subjected to a repeated bending in the direction normal to longitudinal length of the conveyor belt.

In view of this, wiring material for the loop coils buried in the conveyor belt should be of sufficient durability. If any one of the loop coils is easily broken by a cause other than a fissure appearing on the belt surface, the belt fissure detector circuit will cause operation of the annunciator being representative of the occurrence of a fissure in the belt, which is, in this case, not correct. Therefore, weak wiring material for the coils 2 and 6 cannot be employed in order to achieve the objectives of the present invention.

Referring first to FIGS. 18 and 19, a core 31 having sufficient ductility resistance against bending fatigue and made of a strand of yarns of fiber such as polyester, nylon, or glass fiber is provided. A conductive wire 32 with a covering 36 made of suitable material having a higher electric conductivity, for example, a copper alloy in the form of a fine wire or foil strip, is spirally wound around the core 31.

As previously described, since the fine wire is spirally wound around a resilient core material having sufficient ductility and resistance against bending fatigue, the durability and shock resistance of the conductive wire 32 in combination with the core 31 is materially improved.

Another form of the wiring material is shown in FIG. 20 which is a conductive wire consisting of a copper alloy and spirally wound in a form as depicted in FIG. 20.

The spirally wound wiring material thus formed has imparted thereto greater flexibility and extensibility and, therefore, possesses excellent shock resistance and durability when subjected to conveyor belt flexion and bending.

Another form of the wiring material is shown in FIG. 21 which comprises the twisting together of two copper alloy wires in the manner shown.

Since two wires are twisted together, unidirectional flexibility is imparted to the wire combination together with increased extensibility, and therefore, the two-wire combination has excellent shock resistance and durability when subjected to normal conveyor belt flexion and bending.

FIGS. 22 and 23 show a still further form of wiring material for employment in the construction of the loop coils 2 and 6 wherein there is provided shoot yarns 33 for supporting a plurality of the wiring materials of FIG. 18 in the form of a single flat band as indicated in FIG. 23.

Even if some of wires 37 are broken by external causes such as local wearing or scratching, the rest of the wires 37 will compensate for such a breakage to insure proper belt fissure detection.

We claim:

1. A belt fissure detection apparatus comprising a plurality of pairs of first and second loop coils embedded in a conveyor belt and disposed at suitable intervals over the entire length of said belt, said first loop coil extended in the longitudinal direction of said conveyor belt and adjacent to and along one edge of said conveyor belt and said second loop coil extended in a direction at right angles relative to said first loop coil, one end of said second loop coil being overlapped by a corresponding end of said first loop coil adjacent to said conveyor belt edge, and excitor coil connected to an oscillating current source and positioned in proximity to said overlapped loop coil ends of said first and second loop coils, a pair of receiver coils connected to respective terminals of a belt fissure detector circuit and positioned in proximity to the other ends of said first and second loop coils, the arrangement of all of said coils being such that, when said overlapped loop coil ends travel in proximity near said excitor coil as said conveyor belt is being driven, said other loop coil ends at the same time travel in proximity with respective of said receiver coils to provide an electromagnetic coupling circuit between said excitor coil and said receiver coils through said loop coils to produce a pair of electrical signals whereby the occurrence of a fissure in said conveyor belt can be detected by said detector circuit.

2. The belt fissure detection apparatus of claim 1 wherein said electric signals received by said receiver coils are respectively applied to an "OR" circuit and an "AND" circuit, in said detector circuit the output signal of said OR circuit being applied to a set terminal of a bistable flip-flop circuit while the output signal of said AND circuit applied to a reset terminal of said bistable flip-flop circuit through a delay circuit, the output signal of said flip-flop circuit being representative of a breakage of any one of said loop coils embedded in said conveyor belt.

3. The belt fissure detection apparatus of claim 1, wherein each of said loop coils embedded in said conveyor belt comprises a wiring element consisting of a resilient fiber core and a fine conductive wire in the form of strip or foil spirally wound around said core.

4. The belt fissure detection apparatus of claim 1, wherein each of said loop coils embedded in said conveyor belt comprises a wiring element consisting of two lengths of twisted fine conductive wire in the form of strip or foil spirally wound around a resilient fiber core.

5. The belt fissure detection apparatus of claim 1, wherein each of the loop coils comprises a wiring element consisting of a resilient fiber core and a plurality of fine conductive wires in the form of a foil spirally wound around said core, said plurality of wires being arranged in parallel alignment and bound together by shoot yarns to provide a band.

6. The belt fissure detection apparatus of claim 1, wherein each of said receiver coils or said excitor coil comprises a primary winding formed around a ferrite core and a secondary winding formed around said ferrite core adjacent said primary winding, said secondary coil winding forming a resonance circuit in resonance with the excitor frequency imposed upon said primary coil.

7. A belt fissure detection apparatus comprising a plurality of pairs of first and second loop coils embedded in a conveyor belt and disposed at suitable intervals over the entire length of said belt, said first loop coil extended in the longitudinal direction of said conveyor belt and adjacent to and along one edge of said conveyor belt and said second loop coil extended in a direction at right angles relative to said first loop coil, one end of said second loop coil being adjacently spaced from a corresponding end of said first loop coil an excitor coil connected to an oscillating current source and positioned in proximity to both of said spaced loop coil ends of said first and second loop coils, a pair of receiver coils connected to respective terminals of a belt fissure detector circuit and positioned in proximity to the other ends of said first and second loop coils, the arrangement of all of said coils being such that, when said spaced loop coil ends travel in proximity near said excitor coil as said conveyor belt is being driven, said other loop coil ends at the same time travel in proximity with respective of said receiver coils to provide an electromagnetic coupling circuit between said excitor coil and said receiver coils through said loop coils, whereby the occurrence of a fissure in said conveyor belt can be detected by said detector circuit.

8. A belt fissure detection apparatus comprising a plurality of pairs of first and second loop coils embedded in a conveyor belt and disposed at suitable intervals over the entire length of said belt, said first loop coil first extended in the longitudinal direction of said conveyor belt and adjacent to and along one edge of said conveyor belt and said second loop coil extended in a direction at right angles relative to said first loop coil, one end of said second loop coil being adjacently spaced from a corresponding end of said first loop coil, an excitor coil capable of generating two electrical signals of different frequencies and positioned in proximity to said adjacently spaced first and second loop coil ends, a pair of receiver coils connected to respective terminals of a fissure detector circuit and positioned in proximity to the other ends of said first and second loop coils, the arrangement of all said coils being such that, when said adjacently spaced loop coil ends travel in proximity to said excitor coil as said conveyor belt is driven, said other loop coil ends at the same time travel in proximity with respective of said receiver coils to provide an electromagnetic coupling circuit between said excitor coil and said receiver coils through said loop coils, whereby signals received by said receiver coils are applied to circuit filter means for discriminating between said signals due to different frequencies and thereafter applied to respective terminals of said detector circuit.

9. A belt fissure detection apparatus comprising a pair of loop coils embedded in a conveyor belt, one of said coils extended in the longitudinal direction of said belt and adjacent to and along one edge of said belt, the other of said coils extended in a direction transverse to the longitudinal direction of said belt and having one end in overlapped relationship with one end of the first-mentioned loop coil, a second pair of loop coils embedded in said belt at a position adjacent to the first-mentioned pair of loop coils, one of said coils of said second loop coil pair extended in the longitudinal direction of said belt, the other of said coils of said second loop coil pair extended in a direction transverse to the longitudinal direction of said belt and having one end in overlapped relationship with one end of the first-mentioned loop coil of said second loop coil pair, excitor coils each capable of generating an electric signal of oscillating current and each respectively positioned in proximity to one of said overlapped ends of said first and second loop coil pairs, two pairs of receiver coils, each pair connected to respective terminals of a fissure detector circuit and each respectively positioned in proximity to the other ends of said loop coils of each of said loop coil pairs, the arrangement of all of said coils being such that, when said overlapped loop coil ends of each of said loop coil pairs travel in proximity near their respective excitor coil as said conveyor belt is driven, said other ends of said loop coils of each of said loop coil pairs at the same time travel in proximity to their respective receiver coils to provide an electromagnetic coupling circuit between each of said excitor coils and each of said receiver coils whereby the occurrence of a fissure in said conveyor belt can be detected by said detector circuit.

10. A belt fissure detection apparatus comprising a plurality of loop coil members each of quadrangular configuration and together comprising one unit embedded in a conveyor belt and disposed at suitable intervals over the entire length of said belt, the first member of said loop coils including a pair of coil sides extending in the longitudinal direction of said belt in spaced parallel relation to each other and a second pair of the coil sides extending in a direction transverse of the longitudinal direction of said belt, the second member of said loop coils including a pair of coil sides extending in the longitudinal direction of said belt in spaced parallel relation to each other, one of said coil sides in spaced parallel and adjacent relation to one of the longitudinal coil sides of said first member, and a second pair of coil sides extending in a direction transverse of the longitudinal direction of said belt, the third member of said loop coils positioned longitudinally adjacent to said first and second members and including a pair of coil sides extending in the longitudinal direction of said belt in spaced parallel relation to each other, and a pair of coil sides extending in a direction transverse of the longitudinal direction of said belt in spaced parallel and adjacent relation to each other and with one transverse coil sides of each of said first and second members, a pair of excitor coils connected to an oscillating current source and respectively positioned in proximity to said parallel, adjacent transverse sides of said first member, said second member and said third member, a receiver coil positioned in proximity with each of the other transverse sides of said first, second and third members, and connected to a belt fissure detector circuit, whereby the occurrence of a fissure in said conveyor belt can be detected by said detector circuit.

11. A belt fissure detection apparatus comprising a plurality of pairs of first and second loop coils embedded in a conveyor belt and disposed at suitable intervals over the entire length of said belt, said first loop coil of each of said pairs extended in the longitudinal direction of said conveyor belt and adjacent to and along one edge of said conveyor belt and said second loop coil of each of said pairs extended in a direction at right angles relative to said first loop coil, one end of said second loop coil being adjacently spaced from a corresponding end of said first loop coil, a carriage having wheel means rotatable on a pair of rails positioned in a direction normal to the longitudinal direction of said belt, a pair of vertical support shafts for each of said carriages, a guide roller rotatably mounted on the end of each of said support shafts to engage a respective edge of said conveyor belt, tie rod means to couple said carriages together, said carriages having mounted thereon an excitor coil and a pair of receiver coils in aligned relationship to said loop coils, said receiving coils capable of receiving respective signals from said excitor coil through the loop coils, and a fissure detector signal connected to said receiver coils and responsive to said signals therefrom indicative of the occurrence of fissure in said conveyor belt.

12. A belt fissure detection apparatus comprising
a plurality of pairs of first and second elongated loop coils embedded in a conveyor belt at various intervals over the entire length of said conveyor belt
said first loop coil of each pair extended in the longitudinal direction of said conveyor belt and adjacent to and along one edge of said conveyor belt, said second coil of each pair extended in a direction transverse to the longitudinal length of said conveyor for substantially the entire width thereof
one coil end of said second loop coils in close proximity to one end of said first loop coils.

13. The belt fissure detection apparatus of claim 12 characterized in that said one coil end of said first and second loop are in overlayed relation within said conveyor belt.

14. The belt fissure detection apparatus of claim 12 characterized in that said loop coils are of quadrangular configuration.

15. The belt fissure detection apparatus of claim 12 characterized by a fissure detector circuit comprising an excitor coil connected to a current source and a pair of receiver coils connected to a fissure detection circuit means, said excitor coil positioned relative to said conveyor belt to be in electromagnetic coupling to said one end of each of said pair of first and second loop coils as said conveyor belt is driven, each of said receiver coils positioned relative to said conveyor belt to be in electromagnetic coupling to the respective other ends of each of said pairs of first and second loop coils as said conveyor belt is driven, said circuit detection means responsive to signals received from said receiver coils from said excitor through said first and second loop coils indicative of the nonoccurrence of a fissure in said conveyor belt.

16. The belt fissure detection apparatus of claim 15 characterized by conveyor belt tracking means to support said excitor and receiver coils to compensate for lateral meandering of said conveyor belt while the latter is being driven to maintain said coils at all times in electromagnetic coupling relation with said loop coil ends.

17. The belt fissure detection apparatus of claim 15 characterized in that said fissure detection circuit means includes
circuit gate means to receive receiver signals,
a bistable flip-flop network set and reset by the respective output signals of said circuit gate means;
said flip-flop network productive of an output signal when one of said receiver signals is not received at said circuit gate means, and
comparator circuit means connected to receive said flip-flop network output signal and operative of an annunciator when said output signal is greater than a predetermined value.

* * * * *